United States Patent
Guo et al.

(10) Patent No.: US 10,283,746 B2
(45) Date of Patent: May 7, 2019

(54) SMALL PORE SIZE NONWOVEN MAT WITH HYDROPHILIC/ACID RESISTANT FILLER USED IN LEAD ACID BATTERIES AND APPLICATIONS THEREFOR

(71) Applicant: JOHNS MANVILLE, Denver, CO (US)

(72) Inventors: Zhihua Guo, Centennial, CO (US); Gautam Sharma, Cleveland, TN (US); Souvik Nandi, Highlands Ranch, CO (US); Jawed Asrar, Englewood, CO (US); Albert G Dietz, III, Davidson, NC (US)

(73) Assignee: Johns Manville, Denver, CO (US)

( * ) Notice: Subject to any disclaimer, the term of this patent is extended or adjusted under 35 U.S.C. 154(b) by 67 days.

(21) Appl. No.: 15/686,384

(22) Filed: Aug. 25, 2017

(65) Prior Publication Data
US 2017/0358787 A1    Dec. 14, 2017

Related U.S. Application Data

(62) Division of application No. 14/642,361, filed on Mar. 9, 2015, now Pat. No. 9,755,205.

(51) Int. Cl.
| | | |
|---|---|---|
| *H01M 4/73* | (2006.01) |
| *H01M 4/68* | (2006.01) |
| *H01M 4/22* | (2006.01) |
| *H01M 4/20* | (2006.01) |
| *H01M 4/18* | (2006.01) |
| *H01M 4/16* | (2006.01) |
| *H01M 4/14* | (2006.01) |
| *H01M 10/06* | (2006.01) |
| *H01M 10/12* | (2006.01) |
| *H01M 2/16* | (2006.01) |
| *H01M 2/14* | (2006.01) |

(52) U.S. Cl.
CPC ......... *H01M 2/1613* (2013.01); *H01M 2/145* (2013.01); *H01M 2/1646* (2013.01); *H01M 10/06* (2013.01)

(58) Field of Classification Search
None
See application file for complete search history.

(56) References Cited

U.S. PATENT DOCUMENTS

| | | |
|---|---|---|
| 4,606,982 A | 8/1986 | Nelson et al. |
| 2011/0318643 A1 | 12/2011 | Clement et al. |

FOREIGN PATENT DOCUMENTS

| | | |
|---|---|---|
| EP | 2 390 947 A1 | 11/2011 |
| EP | 2 693 529 A1 | 2/2014 |

*Primary Examiner* — Yoshitoshi Takeuchi
(74) *Attorney, Agent, or Firm* — Robert D. Touslee

(57) ABSTRACT

According to one embodiment, a nonwoven fiber mat includes between 10% and 50% by weight of a plurality of first glass fibers having an average diameter of less than 5 μm and between 50% and 90% by weight of a plurality of second glass fibers having an average diameter of greater than 6 μm. The nonwoven fiber mat also includes an acid resistant binder that binds the first and second glass fibers together. The nonwoven fiber mat has an average pore size of between 1 and 100 μm and exhibits an air permeability of below 100 cubic feet per minute per square foot (cfm/ft$^2$) as measured by the Frazier test at 125 Pa according to ASTM Standard Method D737.

19 Claims, 5 Drawing Sheets

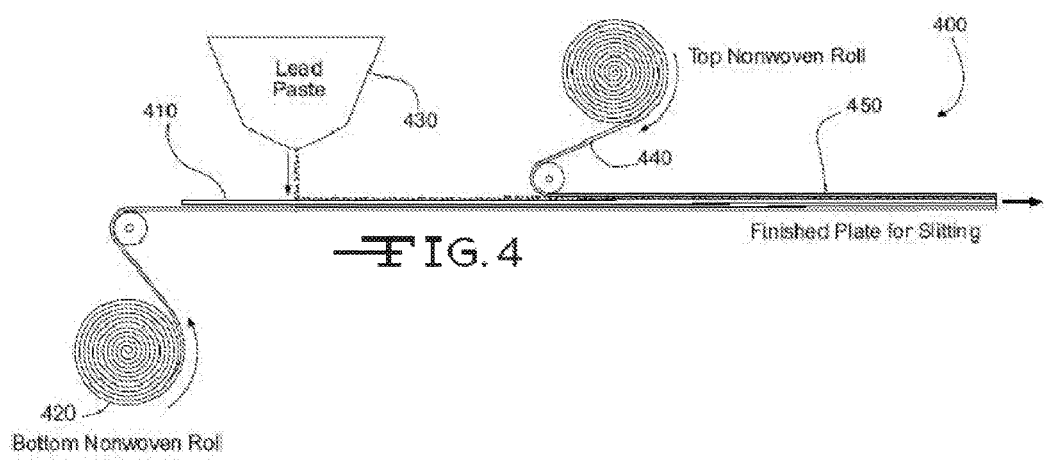

SMALL PORE SIZE NONWOVEN MAT WITH HYDROPHILIC/ACID RESISTANT FILLER USED IN LEAD ACID BATTERIES AND APPLICATIONS THEREFOR

CROSS-REFERENCES TO RELATED APPLICATIONS

This application is a divisional of pending U.S. application Ser. No. 14/642,361, filed Mar. 9, 2015.

This application is related to U.S. application Ser. No. 14/642,273, entitled "WICKING NONWOVEN MAT FORM WET-LAID PROCESS," to Guo et al. filed on Mar. 9, 2015, now U.S. Pat. No. 9,716,293 issued Jul. 5, 2017, the entire contents of which are incorporated by reference herein.

BACKGROUND

Electrodes or electrode plates commonly used in lead-acid batteries often include a metallic grid that is used to support lead and/or lead oxide pastes. During charge and discharge cycles, the volume of the lead and/or lead oxide paste typically expands and contracts. Repeated usage and, thus, repeated charge and discharge cycles may have negative effects on the electrode, such as shedding of the active material particles of the lead and/or lead oxide pastes. To reduce those negative effects, the electrodes may be reinforced with pasting media or pasting paper to keep the lead or lead oxide paste intact. These pasting papers also may have the advantage of wicking electrolyte along the electrode plates. This wicking may help battery performance. These pasting papers in the battery should have adequate wickability and tensile strength, including in the harsh chemical environment within the battery. These and other characteristics and improvements of pasting papers are addressed.

BRIEF SUMMARY

In some instances it may be desired to reduce the air permeability and/or pore size of a nonwoven mat that is used to reinforce an electrode of a lead-acid battery. Such mats may exhibit improved function in limiting shedding of the electrode's active material, which may enhance the life and performance of the battery. According to one aspect, a lead-acid battery is provided. The lead-acid battery includes a positive electrode, a negative electrode, and a nonwoven fiber reinforcement mat that is disposed adjacent the positive electrode or the negative electrode. The nonwoven fiber reinforcement mat includes a plurality of first glass fibers having an average fiber diameter of less than 5 μm (more commonly less than 3 μm), a plurality of second glass fibers having an average fiber diameter of greater than 6 μm (more commonly between 10 μm and 15 μm), and an acid resistant binder composition that binds the plurality of first glass fibers and second glass fibers together. The nonwoven fiber reinforcement mat includes between about 10% and about 50% by weight of the plurality of first glass fibers and between about 50% and 90% by weight of the plurality of second glass fibers. The nonwoven fiber reinforcement mat has an average pore size of between 1 μm and 100 μm and exhibits an air permeability of below 100 cubic feet per minute per square foot (cfm/ft$^2$) as measured by the Frazier test at 125 Pa according to ASTM Standard Method D737. In some embodiments, the nonwoven fiber reinforcement mat has an average pore size of between 1 and 10 μm and/or exhibits an air permeability of below 10 cfm/ft$^2$ or even 1 cfm/ft$^2$ as measured by the Frazier test at 125 Pa according to ASTM Standard Method D737.

According to another aspect, a nonwoven fiber reinforcement mat that is configured for reinforcing an electrode of a lead-acid battery is provided. The nonwoven fiber reinforcement mat includes a plurality of first glass fibers having an average diameter of less than 5 μm (more commonly less than 3 μm), a plurality of second glass fibers having an average diameter of greater than 6 μm (more commonly between 10 μm and 15 μm), and an acid resistant binder composition that binds the plurality of first glass fibers and second glass fibers together. The nonwoven fiber reinforcement mat includes between about 10% and about 50% by weight of the plurality of first glass fibers and between about 50% and 90% by weight of the plurality of second glass fibers. The nonwoven fiber reinforcement mat has an average pore size of between 1 μm and 100 μm and exhibits an air permeability of below 100 cubic feet per minute per square foot (cfm/ft$^2$) as measured by the Frazier test at 125 Pa according to ASTM Standard Method D737. In some embodiments, the nonwoven fiber reinforcement mat has an average pore size of between 1 and 10 μm and/or exhibits an air permeability of below 10 cfm/ft$^2$ or even 1 cfm/ft$^2$ as measured by the Frazier test at 125 Pa according to ASTM Standard Method D737.

According to yet another aspect, a method of making a nonwoven fiber mat for use in reinforcing an electrode of a lead-acid battery is provided. The method includes mixing a plurality of first glass fibers with a plurality of second glass fibers in a white water solution where the first glass fibers have an average fiber diameter of less than 5 μm and the second glass fibers have an average fiber diameter of greater than 6 μm. The method also includes removing a liquid of the white water solution to form a wet laid mat comprising about 10% and about 50% by weight of the plurality of first glass fibers and between about 50% and 90% by weight of the plurality of second glass fibers. The method further includes adding a binder composition to the wet laid mat and drying the wet laid mat and binder composition to produce the nonwoven fiber mat. The nonwoven fiber mat has an average pore size of between 1 μm and 100 μm and exhibits an air permeability of below 100 cubic feet per minute per square foot (cfm/ft$^2$) as measured by the Frazier test at 125 Pa according to ASTM Standard Method D737.

BRIEF DESCRIPTION OF THE DRAWINGS

The present technology is described in conjunction with the appended figures:

FIG. 4 illustrates a process for preparing an electrode or plate having a nonwoven fiber mat disposed on or near a surface of the electrode or plate;

DETAILED DESCRIPTION

Figure 1:
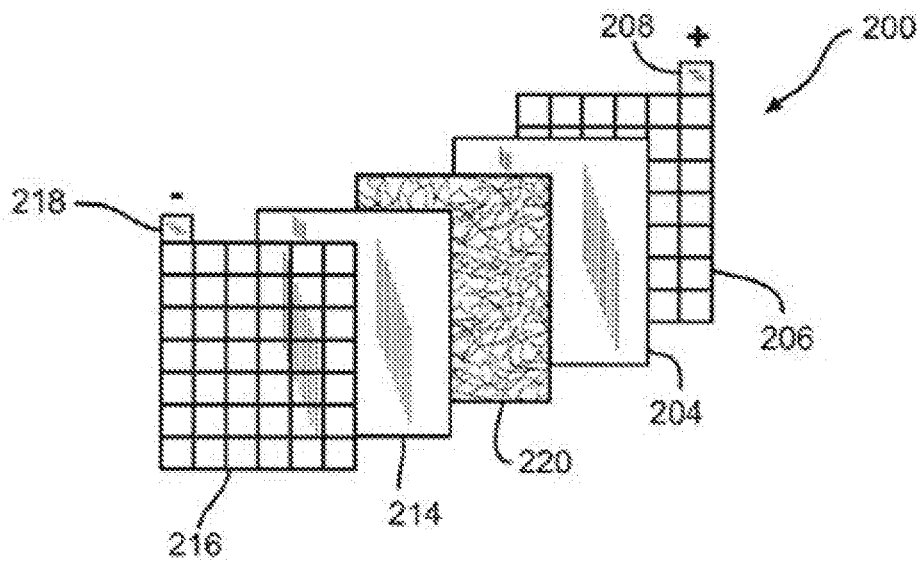
FIG. 1 illustrates an exploded perspective view of a battery cell assembly.

Conventional methods of producing nonwoven fiber mats or pasting papers may result in a fiber mat or pasting paper that is structurally weak and/or suffers from other issues. For example, conventional methods typically produce mats or paper for AGM batteries that are composed essentially of 100% glass microfibers and that are thin, very closed-up, and soft. These mats or paper are typically weak, but exhibit good wicking properties. The nonwoven fiber mat may have high wicking properties, above what is needed for lead-acid batteries and other applications. A wickable nonwoven fiber mat in a battery may help maintain electrolyte or other liquid coverage of electrode plates, but little, if any, data exists to support the high level of wickability in conventional nonwoven fiber mats. This overdesigned wickability characteristic may be the result of a higher concentration of microfibers relative to coarse fibers. An increased concentration of microfibers compared to coarse fibers may result in a nonwoven fiber mat with decreased mechanical strength, which may result from the lower individual mechanical strength with smaller diameter fibers. Pasting mat or paper for flooded lead-acid batteries that are produced via conventional methods are typically very open and thin and do not exhibit good wicking properties. These mats are commonly stronger than those produced for AGM batteries.

Additionally, in addition to providing wickability, in many applications the pasting paper is used to support the active material to limit or prevent shedding of the active material from the electrode. The structural support and/or wickability that the pasting paper provides may be enhanced by reducing the porosity and/or air permeability of the pasting paper. As described in greater detail blow, the porosity and/or air permeability of the pasting paper may be decreased by using filler materials and/or increasing the amount of microfibers that are used in the pasting paper. Conventional pasting papers for flooded lead acid batteries typically do not reduce the porosity and/or air permeability of the pasting paper due to the increase in electrical resistance that results for a decreased porosity and/or air permeability of the pasting paper. Conventional pasting papers for AGM batteries typically exhibit low porosity and air perm. Unlike flooded lead acid batteries, the resistance for AGM pasting papers is not an issue because the pasting papers exhibit good wicking properties. For convenience in describing the embodiments herein, the application will focus mainly on the use of the embodiments in flooded lead acid batteries. It should be realized, however, that the embodiments described herein may also be used in AGM battery applications. In such embodiments, the nonwoven fiber mat will generally comprise a majority of smaller diameter fibers, such as microfibers.

Conventional processes of making nonwoven fiber mats for AGM batteries and other applications may be more expensive and/or have lower throughput. The higher concentration of microfibers, which are generally more expensive than coarse fibers, may increase material cost. Acids may often be used to disperse microfibers to create a uniform mixture of microfibers and coarse fibers. The low pHs (usually less than 3) may be corrosive, and the process may require equipment made from stainless steel or other expensive materials. Because of the challenge in dispersing microfibers, conventional processes may be run in batch or semi-batch operations to ensure a sufficiently uniform mixture of fibers. For these and other reasons, materials and methods used in conventional nonwoven fiber mat for AGM battery technologies may not be cost effective or efficient.

In many embodiment, the nonwoven fiber mats consist of coarse glass fibers and glass micro-fibers that are homogeneously dispersed throughout the nonwoven fiber mat. This configuration or composition is different than that employed for conventional mats, which typically have a dual layer construction—i.e., coarse fibers forming a layer and microfibers forming another layer adjacent the layer of coarse fibers. For example, U.S. Pat. No. 4,336,314 to Yonezu et al., describes a conventional mat having such a duel layered construction. Conventional mats employ the dual layer construction due to the difficulty in homogeneously dispersing coarse glass fibers and micro-glass fibers during formation of the nonwoven fiber mat. For example, as known in the art, producing a nonwoven glass mat having coarse glass fibers in a wet laid process requires a set of parameters that are vastly different than the parameters that are used to produce a nonwoven glass mat having micro-fibers. The vast difference in the manufacturing parameters typically results in a concentration of one of the fibers within the resulting nonwoven fiber mat. In contrast, the manufacturing process used to produce the nonwoven fibers mats described herein are highly controlled and optimized to produce a homogenous dispersion of the coarse glass fibers and micro-glass fibers in the resulting nonwoven fiber mat. The resulting homogenous nonwoven fiber mat exhibits many benefits over the dual layered construction of conventional mats. For example, the homogenous nonwoven fiber mat exhibits a relatively uniform resistance across the mat, which results in a uniform current and/or utilization of the active materials.

As used herein the term "pasting paper" refers to a material that is placed adjacent an electrode of a lead acid battery, typically during the manufacture of the electrode such as during the application of the active material to a metal grid. The pasting paper may remain in place adjacent the electrode during use of the lead acid battery to limit or prevent shedding of the active material from the electrode. Although the term "paper" is used in describing the material, in many of the embodiments described herein the pasting paper material is a nonwoven fiber mat that is typically made of a combination of glass fibers. In some embodiments the nonwoven fiber mat may consist entirely of glass fibers, although in other embodiments various other fiber types may also be used including polymeric fibers, cellulose fibers, and the like. The term pasting paper may be used interchangeably herein with reinforcement mat, nonwoven fiber reinforcement mat, and/or nonwoven fiber mat, but it should be realized that these terms may refer to the same material. Other filler materials may also be added to the nonwoven fiber mat for various reasons, some of which are described in greater detail herein. These and other aspects of the embodiments may be more fully appreciated with reference to the description of the several figures provided herein below.

Figure 2:
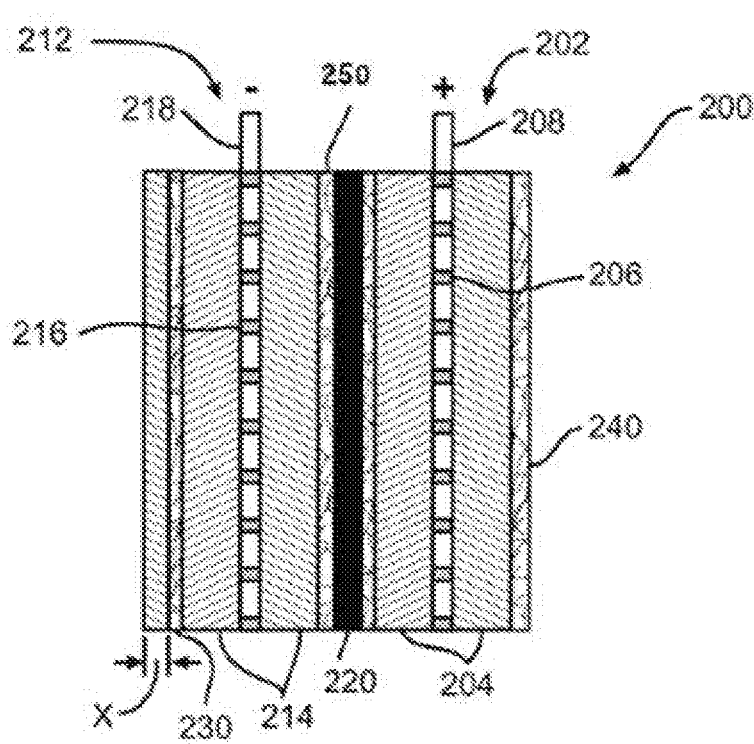
FIG. 2 illustrates an assembled cross section view of the battery cell assembly of FIG. 1.

FIGS. 1 and 2, respectively, show a perspective exploded view of a lead-acid battery cell 200 and a cross-section assembled view of the lead-acid battery cell 200. The lead-acid battery cell 200 may represent a cell used in either flooded lead-acid batteries or Absorptive Glass Mat (AGM) batteries. Each cell 200 may provide an electromotive force (emf) of about 2.1 volts and a lead-acid battery may include 3 such cells 200 connected in series to provide an emf of about 6.3 volts or may include 6 such cells 200 connected in series to provide an emf of about 12.6 volts, and the like. Cell 200 may include a positive plate or electrode 202 and a negative plate or electrode 212 separated by battery separator 220 so as to electrically insulate the electrodes 202 and 212. Positive electrode 202 may include a grid or conductor 206 of lead alloy material. A positive active material 204, such as lead dioxide, is typically coated or pasted on grid 206. Grid 206 is also typically electrically coupled with a positive terminal 208. Grid 206 provides structural support for the positive active material 204 along with electrical conductivity to terminal 208.

Likewise, negative electrode 212 includes a grid or conductor 216 of lead alloy material that is coated or pasted with a negative active material 214, such as lead. Grid 216 is electrically coupled with a negative terminal 218. Like grid 206, grid 216 structurally supports the negative active material 214 along with providing electrical conductance to terminal 218. In flooded type lead-acid batteries, positive electrode 202 and negative electrode 212 may be immersed in an electrolyte (not shown) that may include a sulfuric acid and water solution. In AGM type lead-acid batteries, the electrolyte may be absorbed and maintained within battery separator 220. Battery separator 220 may be positioned between positive electrode 202 and negative electrode 212 to physically separate and electrically insulate the two electrodes while enabling ionic transport, thus completing a circuit and allowing an electronic current to flow between positive terminal 208 and negative terminal 218. Separator 220 may include a microporous membrane (i.e., the solid black component), which is often a polymeric film having negligible conductance. The polymeric film may include micro-sized voids that allow ionic transport (i.e., transport of ionic charge carriers) across separator 220. In some examples, the microporous membrane or polymeric film may have a thickness of 50 micrometers or less, including 25 micrometers or less, may have a porosity of about 50% or 40% or less, and may have an average pore size of 5 micrometers or less, including 1 µm or less. The polymeric film may include various types of polymers including polyolefins, polyvinylidene fluoride, polytetrafluoroethylene, polyamide, polyvinyl alcohol, polyester, polyvinyl chloride, nylon, polyethylene terephthalate, and the like. Separator 220 may also include one or more fiber mats (e.g., separator support mat) that are positioned adjacent one or both sides of the microporous membrane/polymeric film to reinforce the microporous membrane and/or provide puncture resistance. In AGM applications, the polymeric film may not be included. Instead, the nonwoven fiber mat separator 220 may be relatively thick and used to both absorb the electrolyte and electrically isolate the positive and negative electrodes.

Figure 3A:
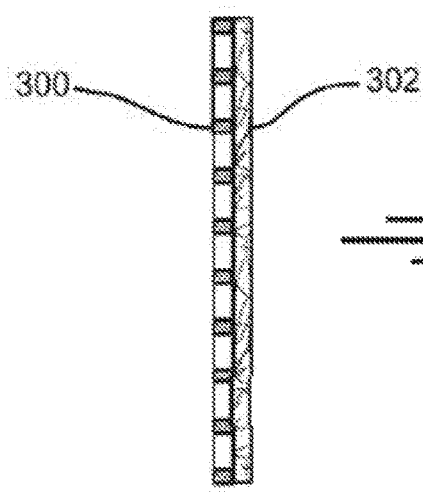
FIGS. 3A-3C illustrate cross section views of various configurations of an electrode or plate and a nonwoven fiber mat.
Figure 3B:
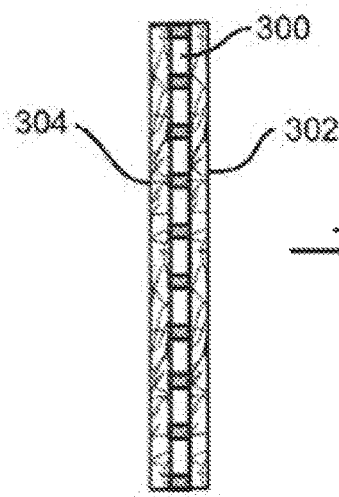
Figure 3C:
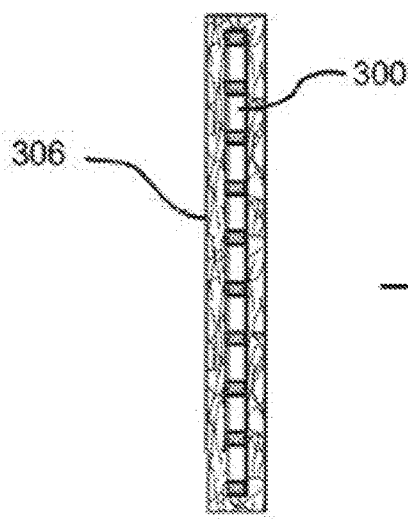

Positioned near a surface of negative electrode 212 may be a nonwoven fiber mat 230 (referred to herein as a reinforcement mat, nonwoven fiber reinforcement mat, or nonwoven fiber mat). Reinforcement mat 230 may be disposed partially or fully over the surface of negative electrode 212 so as to partially or fully cover the surface. As shown in FIG. 3A-C, a reinforcement mat 230 may be disposed on both surfaces of the negative electrode 212, or may fully envelope or surround the electrode. Likewise, although reinforcement mat 230 is shown on the outer surface of the electrode 212, in some examples, reinforcement mat 230 may be positioned on the inner surface of the electrode 212 (i.e., adjacent separator 220). Reinforcement mat 230 may reinforce the negative electrode 212 and may provide an additional supporting component for the negative active material 214. The additional support provided by reinforcement mat 230 may help reduce the negative effects of shedding of the negative active material particles as the active material layer softens from repeated charge and discharge cycles. This may reduce the degradation commonly experienced by repeated usage of lead-acid batteries. As described in greater detail below, the structural support provided by the reinforcement mat 230 may be greatly enhanced by reducing the porosity and/or air permeability of the reinforcement mat 230.

Reinforcement mat 230 may often be impregnated or saturated with the negative active material 214 so that the reinforcement mat 230 is partially or fully disposed within the active material 214 layer. Impregnation or saturation of the active material within the reinforcement mat means that the active material penetrates at least partially into the mat. For example, reinforcement mat 230 may be fully impregnated with the negative active material 214 so that reinforcement mat 230 is fully buried within the negative active material 214 (i.e., fully buried within the lead paste). Fully burying the reinforcement mat 230 within the negative active material 214 means that the mat is entirely disposed within the negative active material 214. For example, reinforcement mat 230 may be disposed within the negative active material 214 up to about a depth X of about 20 mils (i.e., 0.020 inches) from an outer surface of the electrode 212. In other examples, the glass mat 230 may rest atop the negative active material 214 so that the mat is impregnated with very little active material. Often the reinforcement mat 230 may be impregnated with the negative active material 214 so that the outer surface of the mat forms or is substantially adjacent the outer surface of the electrode 212 (see reinforcement mat 240). In other words, the active material may fully penetrate through the reinforcement mat 230 so that the outer surface of the electrode 212 is a blend or mesh of active material and reinforcement mat fibers.

The thickness of the glass mat may be a function of mat weight, binder content (as measured by Loss on Ignition [LOI]), and fiber diameter. The type of binder used and the length of the fibers may be weaker factors in determining the glass mat thickness. Higher binder content, however, may generally reduce the glass mat thickness, although excessive binder use may pose various processing challenges during mat production and thereafter. A lower mat weight may also reduce the mat thickness. The mat weight, however, may also be limited because the mat needs to provide enough tensile strength during winding and downstream processes.

As described herein, reinforcement mat 230 may include a plurality of glass fibers and an acid resistant binder that couples the plurality of glass fibers together to form the reinforcement mat. Reinforcement mat 230 may have an area weight of between about 10 and 100 g/m$^2$, including between about 20 and 60 g/m$^2$. Reinforcement mat 230 may be used for reinforcing a plate or electrode of a lead-acid battery and may include a relatively homogenous mixture of coarse glass fibers that may include a plurality of first glass fibers having a diameter between about 0.01-5 µm and a plurality of second fibers having a diameter of at least 6 µm. In some examples the relatively homogenous mixture may make up between about 70-95% of the mass of the mat 230. In some examples, the homogenous mixture may also include 5-30% conductive fibers. For example, conductive fibers having diameters about 6 µm and above and having lengths between about 8 and 10 mm can be included in the relatively homogenous mixture. The reinforcement mat 230 also includes an acid resistant binder that bonds the plurality of first and second glass fibers together to form the reinforcement mat 230. The reinforcement mat 230 further includes a wetting component that is applied to reinforcement mat 230 to increase the wettability/wickability of the reinforcement mat 230. The wettability/wickability of the reinforcement mat 230 may be increased such that the reinforcement mat 230 has or exhibits an average wick height of 40 wt. % sulfuric acid of at least 1.0 cm after exposure to the respective solution for 10 minutes in accordance with a test conducted according to method ISO8787.

As briefly described above, reinforcement mat 230 may include a plurality of electrically insulative fibers, such as glass, polyolefin, polyester, and the like, which are primarily used to reinforce the electrode. Because the reinforcement mat 230 may be made of such insulative fibers, the reinforcement mat 230 may be essentially non-conductive prior to or without the addition of the conductive material. For example, without combining or adding the conductive material/layer, the reinforcement mat 230 may have an electrical resistance greater than about 1 Megohm per square. In manufacturing the reinforcement mat 230, water or another liquid may be removed (e.g., via a vacuum) from a suspension of the fibers in the liquid medium. A binder may then be applied to the wet-laid non-woven glass or polyolefin fibers to form reinforcement mat 230. As described previously, in some examples, the conductive material or fibers may be added to the binder and/or to the liquid medium. As an example, reinforcement mat 230 may have a thickness of between about 50 µm and about 500 µm and have an average pore size of between about 5 µm and about 5 millimeters.

The reinforcement mat 230 also may include a wetting component that is applied to the reinforcement mat to increase the wettability/wickability of the reinforcement mat. The wettability/wickability of the reinforcement mat 230 may be increased so that the reinforcement mat has or exhibits an average wick height of 40 wt. % sulfuric acid of at least 0.5 cm after exposure to the respective solution for 10 minutes in accordance with a test conducted according to method ISO8787. The mat may exhibit an average wick height of the 40 wt. % sulfuric acid solution of at least 0.5 cm without an additional wetting component.

As described herein, the wetting component may be a wettable component of the acid resistant binder (e.g., a hydrophilic functional group), a hydrophilic binder that is mixed with the acid resistant binder, the wetting component may be component fibers (e.g., cellulose, cotton, other natural fibers, polyester, other synthetic fibers, or a combination of natural and/or synthetic fibers) that are bonded with the glass fibers of the reinforcement mat 230, or the wetting component may be a wettable solution (e.g., starch or cellulose solution) that is applied to the reinforcement mat 230 such that the wettable solution saturates the reinforcement mat 230 or is disposed on at least one surface of the reinforcement mat 230 upon drying of the wettable solution. In some examples, the wetting component may include a combination of any of the aforementioned components, such as a combination of cellulose fibers and an acid resistant binder having a wettable component. In specific examples, the glass fibers of reinforcement mat 230 may include first fibers having fiber diameters between about 0.5 µm and about 5 µm or between about 0.5 µm and about 1 µm and second fibers having fiber diameters of at least about 6 µm. According to some examples, the component fibers may form a component fiber mat that is bonded to at least one side of the glass reinforcement mat 230 such that the reinforcement mat 230 comprises a two layer mat configuration. The component fibers may be mixed with the glass fibers such that upon forming the glass mat the component fibers may be entangled with and bonded to the glass fibers.

Referring now to FIGS. 3A-3C, illustrated are various electrode-reinforcement mat configurations. FIG. 3A illustrates a configuration where an electrode 300 has a single reinforcement mat 302 disposed on or near an outer surface. As described above, reinforcement mat 302 may include a conductive material and/or layer so as to enable electron flow on a surface and/or through reinforcement mat 302 to a battery terminal. Reinforcement mat 302 may also include a wetting component as described above to provide the mat 302 with enhanced wettability characteristics. Reinforcement mat 302 may partially or fully cover the outer surface of electrode 300. The configuration of FIG. 3B may be similar to that of FIG. 3A except that an additional reinforcement mat 304 may be disposed on or near an opposite surface of electrode 300 so that electrode 300 may be sandwiched between the two glass mats, 302 and 304. Either or both reinforcement mats, 302 and 304, may include a conductive material and/or layer to enable electron flow to a battery terminal as well as a wetting component. As such, electrode 300 may be sandwiched between two conductive reinforcement mats 302 and 304. FIG. 3C illustrates a configuration where a reinforcement mat 306 may envelop or surround electrode 300. Although FIG. 3C illustrates the reinforcement mat 306 fully enveloping the electrode 300, in many examples a top side or portion of the mat 306, or a portion thereof, is open. Glass mat 306 may include the conductive material and/or layer as described above to enable electron flow as well as a wetting component.

Referring back to FIGS. 1 and 2, positioned near a surface of positive electrode 202 is a reinforcement mat 240. Reinforcement mat 240 may be arranged and/or coupled with positive electrode 202 similar to the arrangement and coupling of reinforcement mat 230 with respect to negative electrode 212. For example, reinforcement mat 240 may be disposed partially or fully over the surface of positive electrode 202 so as to partially or fully cover the surface, may be positioned on an inner surface of the electrode 202 (i.e., adjacent separator 220) instead of the shown outer surface configuration, and/or may be impregnated or saturated with the positive active material 204 so that the reinforcement mat 240 is partially or fully disposed within the active material 204 layer. Like reinforcement mat 230, reinforcement mat 240 may provide additional support to help reduce the negative effects of shedding of the positive active material particles due to repeated charge and discharge cycles.

With regard to the reinforcement functions of reinforcement mats 230 and/or 240, in some examples the reinforcing aspects of these mats may be enhanced by blending fibers having different fiber diameters. Reinforcement mats 230 and 240 (referred to hereinafter as reinforcement mat 230) can have similar characteristics and compositions, and can include a blend of two or more different diameter fibers. Reinforcement mat 230 includes a plurality of first microfibers, having fiber diameters ranging between about 0.5 µm and about 5 µm, between about 0.5 µm and about 1 µm, or between about 0.7 µm and about 2 µm. The first microfibers are blended with a plurality of second coarse fibers, having fiber diameters of at least about 6 µm, and typically between about 8 µm and about 20 µm, and more commonly between about 10 µm and about 15 µm. In some examples, the plurality of second coarse fibers may include a silane material sizing. The blend of the two or more different diameter fibers results in a mat that is sufficiently strong to structurally support the active material as described above and to withstand the various plate manufacturing processes while also minimizing the thickness and overall size of the mat. Reducing the thickness of reinforcement mat 230 while maintaining mat strength may be desired since reinforcement mat 230 typically is a chemically inactive component and, thus, does not contribute to the battery's electrochemical process. Reducing the volume of reinforcement mat 230 helps minimize the battery's volume of non-electrochemically contributing components.

In examples, reinforcement mat 230 includes a blend of between 10% and 50% of the first microfibers and between 50% and 90% of the second coarse fibers. In these or other examples, reinforcement mat 230 may include a blend of between 20% and 30% of the first microfibers and between 70% and 80% of the second coarse fibers. In these or other examples, reinforcement mat 230 may include a blend of between 30% and 50% of the first microfibers and between 50% and 70% of the second coarse fibers. In some examples, reinforcement mat 230 may include a blend of between 15% and 40% of the first microfibers and between 60% and 85% of the second coarse fibers. In yet other examples, the blend of first microfibers and second coarse fibers is approximately equal (i.e., 50% of the first microfibers and second coarse fibers).

The length of the coarse fibers may also contribute to the overall strength of reinforcement mat 230 by physically entangling with adjacent fibers or fiber bundles and/or creating additional contact points where separate fibers are bonded via an applied binder. In examples, the coarse fibers have fiber lengths that range between about ⅓ inch and about 1½ inches, although an upper length limit of 1¼ inch is more common. This range of lengths provides sufficient mat strength while allowing the fibers to be dispersed in a white water solution for mat processing applications. In other examples, the coarse fibers have fiber lengths that range between ½ and ¾ of an inch. The fibers lengths of the first microfibers may be different than the fibers lengths of the second coarse fibers.

The type and amount of binder used to bond the first microfiber and second coarse fibers together may also contribute to the overall strength and thickness of reinforcement mat 230. As described above, the binder is generally an acid and/or chemically-resistant binder that delivers the durability to survive in the acid environment throughout the life of the battery, the strength to survive the plate pasting operation, and the permeability to enable paste penetration. For example, the binder may be an acrylic binder, a melamine binder, a UF binder, or the like. The binder may also include and bond the conductive material to the first and/or second coarse fibers. Increased binder usage may reduce the thickness of reinforcement mat 230 by creating more fiber bonds and densifying reinforcement mat 230. The increased fibers bonds may also strengthen reinforcement mat 230. In examples, the binder is applied to the first microfibers and second coarse fibers such that the binder comprises between about 5% and 45% by weight of the reinforcement mat 230 or between about 15% and 35% by weight of the reinforcement mat. In some examples, the binder is applied to the first microfibers and second coarse fibers such that it comprises between about 5% and 30% by weight of the reinforcement mat 230.

As described herein, the conductive material may be mixed with the binder or a secondary binder and applied to the first and/or second coarse fibers during manufacture of the reinforcement mat 230 or subsequent thereto.

The wetting component may be mixed with the binder in some examples. The resulting reinforcement mat 230 may have or exhibit an average wick height of at least 0.5 cm after exposure to sulfuric acid having 40 wt. % $H_2SO_4$ and/or a specific gravity of 1.28 for 10 minutes conducted according to method ISO8787, except that sulfuric acid having 40 wt. % $H_2SO_4$ and/or a specific gravity of 1.28 is used in place of water. The wetting component may be dissolvable in an acid solution of the lead-acid battery such that a significant portion of the nonwoven fiber mat is lost due to dissolving of the wetting component. For example, between about 5-85% of the mass of the reinforcement mat 230 may be lost.

Referring now to FIG. 4, illustrated is a process 400 for manufacturing an electrode. The process may involve transporting a lead alloy grid 410 on a conveyor toward an active material 430 applicator (e.g., lead or lead oxide paste applicator), which applies or pastes the active material 430 to the grid 410. A nonwoven mat roll 420 may be positioned below grid 410 so that a reinforcement mat is applied to a bottom surface of the grid 410. The reinforcement mat may include a conductive material and/or layer, as well as a wetting component, as described herein. In some examples, the reinforcement mat may also include a blend of fibers as described herein. In some examples, the reinforcement mat may also include a blend of coarse fibers and microfibers in addition to the wetting component as described herein. A second nonwoven mat roll 440 may be positioned above grid 410 so that a second reinforcement mat is applied to a top surface of the grid 410. The second reinforcement mat may also include a conductive material, a wetting component, and/or layer and/or blend of coarse fibers and/or microfibers (similar to or different from reinforcement mat 420). The resulting electrode or plate 450 may subsequently be cut to length via a plate cutter (not shown). As described herein, the active material 430 may be applied to the grid 410 and/or top and bottom of reinforcement mats, 440 and 420, so that the active material impregnates or saturates the mats to a desired degree. The electrode or plate 450 may then be dried via a dryer (not shown) or other component of process 400. As described herein, the reinforcement mats, 440 and 420, may aid in the drying of the electrode or plate 450 by wicking the water and/or water/acid solution from the electrode or plate 450 so as to allow the water and/or water/acid solution to evaporate.

As described briefly above, one of the main functions of the pasting paper is to minimize the shedding of active materials during charging and discharging of the battery. The reduced shedding of the active materials is believed to prolong the life of the battery. Active shedding is reduced by the structural support provided by the pasting paper. When the active material is shed, it may not participate in the chemical reaction that produces battery power. For example, when the active material is shed from the plate, it may mix with or into the electrolyte. The active material may sink to the bottom of the battery if the active material particles are sufficiently large. This shed active material cannot reform with the plate and therefore cannot be used in the chemical reaction. In other words, the shed material is not an "active material" any longer. As such, the utilization of active material is reduced, which negatively effects the battery performance and life. Similarly, when the shed active material particle size is small, the shed active material from the positive plate can leak or migrate to the negative side to convert to lead. The lead particles can align and shorten the positive and negative plates. The wickability and/or structural support provided by the pasting paper may be increased by reducing the porosity and/or air permeability of the pasting paper. The porosity and/or air permeability of the pasting paper may be decreased by using filler materials and/or increasing the amount of microfibers that are used in the pasting paper.

In regards to the wickability of conventional mats, conventional processes typically use a thin nonwoven glass mat or PET (polyethylene terephthalate) mat for the plate pasting applications in flooded lead acid batteries. PET mats are commonly used for "EFB" batteries (Enhanced Flooded Battery). In general, these mats do not have any significant wicking property—i.e., the wicking height is essentially zero by the test method defined in 1S08787. A mat with good wicking properties is desirable because it tends to reduce the internal resistance of the battery. As described above, some AGM batteries use mats that are essentially made of glass microfibers. However, these mats are likely over engineered for the wicking purposes and lack sufficient strength, which can cause processing issues during pasting and therefore lower efficiency of the battery. A mat possessing good wicking and strength properties is desired.

In regards to separators, the configuration of a polyethylene membrane with a supporting mat (typically a nonwoven glass mat without significant wicking property) does not work well when routine battery maintenance is not performed (e.g., fail to add water regularly) or when the battery is under high temperatures for a prolonged period of time. The battery tends to lose water (partial "dry out"), which leads to at least two issues. First, the upper parts of the electrode plates are exposed to air and the negative plates can be oxidized. In addition, due to less volume of the electrodes in the electrolyte, the usage of active materials can be reduced, therefore lowering the capacity and performances of the battery. Second, the electrolyte sulfuric acid becomes more concentrated and the resulting acid concentration is not optimal. This higher concentration may reduce the battery performances as well as be more corrosive to all the battery parts, include the plates, separator, and container. A support mat having good wicking properties for the electrolyte, such as those described herein, enables the mat to hold some of the electrolyte and cover the electrodes when the volume of the electrolyte reduces due to the exposure of high temperatures for a prolonged period of time. As such, the oxidization of the negative plate can be minimized.

Conventional pasting papers typically do not reduce the porosity and/or air permeability of the pasting paper due to the increase in electrical resistance that results for a decreased porosity and/or air permeability of the pasting paper. For example, the average pore size of some pasting papers is larger than 1 mm and the air perm measured by the Frazier test described by ASTM Standard Method 0737 is usually over 1000 cfm/ft2 (at 125 Pa). One reason that conventional pasting papers are not concerned with decreased pore size and/or air permeability is that an average pore size that is too low significantly increases the internal/electrical resistance of the lead acid battery and, therefore, leads to adverse battery performance. For example, if the mat is too closed or dense, the electrical resistance increases because the ions do not have a good path to flow through the mat. Stated differently, a closed or dense mat results in the ions following a tortuous path through the mat, which affects the chemical reactions and increases the internal resistance of the battery.

The formula below may be used to evaluate the resistance of a separator. The formula is also applicable for evaluating the impact of a glass mat, such as a separator support or pasting paper. As indicated by the formula, with lower air perm/lower pore size, the electrical resistance of the glass mat increases. Also when the pore size is very small, it may negatively impact the crystallization of active material. Further, when the glass mat is more open, the glass mat may be more beneficial for pasting of the active material since the active material can penetrate through the glass mat and thereby achieve a better adhesion/bonding between the glass mat and the plate. The resistance of the glass mat is a function of electrolyte resistivity (acid) in addition to the design, pore structure, and composition of the glass mat. Resistance (R) of the electrolyte within a porous structure (Ω) may be determined according to the formula:

$$R = pL\tau^2/PA$$

Where p is equal to the resistivity of the electrolyte; L is equal to the thickness of the glass mat; $\tau$ is equal to the tortuosity of the pore path (structure); P is equal to the porosity filled with acid (structure and composition); and A is equal to the cross-sectional area through which ions flow.

Conventional pasting papers and separator support mats are thin and open (i.e., have larger pore sizes) to minimize the electrical resistance and maximize the functionality and contact between the electrode and electrolyte. Moreover, conventional pasting paper and/or separator support mats having a combination of different sized fibers and/or hydrophilic components typically have "needle holes" due to being manufactured using a conventional wet-laid process. The needle holes are commonly due to the pasting paper and/or separator support mats mirroring the surface upon which it is formed. For example, in a conventional wet-laid process, a wet mat is formed on a forming chain or belt. The wet mat is then transported onto an application chain where the binder is applied. The mat is then transported onto the oven chain for drying and curing. The wet mat mirrors the shape of the various chains/belts, which commonly results in small holes (i.e., "pin-holes" or "needle holes") forming in the mat. The wicking properties of such pasting papers and support mats is reduced due to the existence of those "needle holes". The needle holes also result in the pasting papers and support mats having larger pore sizes, which increases the air permeability of the mats.

The pasting papers and/or separator support mats described herein are configured to have significantly reduced pore sizes and air permeability. These pasting papers and/or separator support mats also exhibit excellent wickability and strength properties as described above. The small pore size and lower air permeability is an indicator of how closed or dense the mat's fibers are, which prevents shedding by minimizing the space that the active material can transition or move into. In one embodiment, the pore sizes and air permeability is reduced by employing an optimal combination of larger diameter glass fibers and smaller diameter glass fibers. The larger diameter glass fibers are typically fibers having a fiber diameter of greater than 6 μm, although a fiber diameter of between 8 μm and 20 microns is more common, and a fiber diameter of between about 10 μm and 15 microns is most common. The smaller diameter glass fibers or microfibers typically have a fiber diameter of less than 5 μm, and more commonly between about 0.5 μm and 5 μm, and most commonly between about 0.7 μm and 3 μm. The use of the microfibers in the ranges claimed herein results in increased "bridging" of the fibers in the pasting paper. The term bridging as used herein describes tangling of and between the fibers within the resulting pasting paper mat. The increased tangling or bridging reduces the effects of "needle holes" thereby essentially covering up the created holes.

In other embodiments a hydrophilic filler or fillers with good acid resistance and large surface area can be added during the wet laid process to fill the needle holes that are formed during the wet-laid process. The added hydrophilic fillers significantly reduce the pore size and air permeability of the resulting mat and may make the resulting mat smoother. The wicking property of the resulting mat and the ability to structurally support the active material (i.e., prevent shedding of the active material) is therefore significantly improved.

According to one embodiment, a nonwoven fiber mat that is configured for reinforcing an electrode of a lead-acid battery (hereinafter pasting paper) includes a plurality of first or microfiber glass fibers having an average fiber diameter of less than 5 µm, and more commonly less than 3 µm. As mentioned herein, in some embodiments the microfibers may not have an average fiber diameter of about 1 µm. In a specific embodiment, the microfibers may have an average fiber diameter of about 0.7 µm. The pasting paper may also include a plurality of second or coarse glass fibers having an average diameter of greater than 6 µm, and more commonly between about 8 µm and 20 µm and most commonly between about 10 µm and 15 µm. In a specific embodiment, the coarse glass fibers may have an average fiber diameter of about 13 µm. The pasting paper further includes an acid resistant binder composition that binds the plurality of microfibers and coarse glass fibers together.

The pasting paper includes between about 10% and about 50% by weight of the microfibers and between about 50% and 90% by weight of the coarse glass fibers. In a specific embodiment, the pasting paper includes approximately 70% by weight of the coarse fibers and 30% by weight of the microfibers, excluding other materials that are applied to the pasting paper, such as the binder and/or any filler materials. The pasting paper has an average pore size of between 1 µm and 100 µm and exhibits an air permeability of below 100 cubic feet per minute per square foot (cfm/ft$^2$) as measured by the Frazier test at 125 Pa according to ASTM Standard Method D737. In some embodiments, the pasting paper may have an average pore size of between 1 and 50 µm and/or may exhibit an air permeability of below 10 cfm/ft$^2$ or even 1 cfm/ft$^2$ as measured by the Frazier test at 125 Pa according to ASTM Standard Method D737.

The pore sizes described herein of between 1 µm and 10 µm or 100 µm is significantly smaller than those used in conventional pasting papers while the air permeability of less than 1 cfm/ft$^2$, 10 cfm/ft$^2$, or 100 cfm/ft$^2$ is also significantly less than those exhibited by conventional pasting papers. For example, conventional pasting papers typically have a pore size of 1 mm or greater and exhibit an air permeability of 1000 cfm/ft$^2$ or more. The lower pore size and/or air permeability of the pasting paper described herein may result in the internal electrical resistance of the battery being increased to some extent, but will also greatly increase the structural support that is offered by the pasting paper (i.e., reduce shedding of the active material) while also exhibiting enhanced wickability and strength characteristics. Any increase in the electrical resistance of the pasting paper may be countered by the increased wickability of the pasting paper. Stated differently, the increased wicking properties of the pasting paper can help reduce the electrical resistance of the pasting paper and battery.

For example, in some embodiments, the pasting paper may exhibit an average wick height of between about 1 cm and about 5 cm after exposure to sulfuric acid having 40 wt. % H2SO4 and/or a specific gravity of 1.28 for 10 minutes conducted according to method ISO8787, except that sulfuric acid having 40 wt. % H2SO4 and/or a specific gravity of 1.28 is used in place of water. The pasting paper may also exhibit a tensile strength of greater than 4 lbf/in. The pasting paper may also exhibit the other wickability and/or strength properties described herein.

In some embodiments a hydrophilic filler or fillers may be added to the pasting paper. For example, the pasting paper may include between 0.1% and about 20% by weight of a powder or granular filler.

The powder or granular filler is hydrophilic and acid resistant and has a surface area of greater than 10 m$^2$/g, and in main embodiments has a surface area of 150 m$^2$/g or greater. These powder or granular filler decreases the pore size and air permeability of the nonwoven fiber reinforcement mat. In some embodiments, the powder or granular filler is applied to a second binder that is subsequently applied to the pasting paper, commonly before the pasting paper is dried such as by adding the second binder simultaneously with, or close to, the application of the primary binder. In yet other embodiments, the powder or granular filler may be added to the primary binder or to the white water solution that includes the coarse and microfibers. The application of the powder or granular filler to a binder (i.e., primary or secondary) helps bond or adhere the powered filler to the pasting paper after application of the filler.

The powder or granular filler may comprises about 20% or less by weight of the primary or second binder composition that is applied to the nonwoven fiber reinforcement mat. The amount of powder or granular filler that is included in the binder may depend on the machine that is used to mix and/or apply the binder. The amount of 20% may be an upper limit for high end mixing and/or application machines while an amount of less than 10% by weight of the filler material may be more common. An amount of between 2% or 4% of the powered filler may be more ideal for application to the pasting papers since these amounts are easier to mix, control, and/or apply to the pasting paper. For example, in some instances the use of more than 4% of the powder or granular filler by weight of the binder may negatively affect removal of the binder and/or other aqueous solutions. The application of too much powder or granular filler can essentially create an impermeable or nearly impermeable surface that decreases the amount of water or other liquids that may be vacuumed out of the pasting paper, thereby negatively affecting drying of the pasting paper. As such, an application of less than 10% by weight of the powder or granular filler may be preferred with an application of less than 5% by weight, such as 2% to 4%, being most preferred.

Due to the decreased pore size and air permeability of the pasting papers described herein, the papers function as filters that filter out the powder or granular filler from the applied binder. As such, the resulting amount of powder or granular filler in the pasting paper is typically greater than the amount that is used in the binder. Stated differently, because the pasting paper filters the powder or granular filler out of the applied binder, the concentration of the powder or granular filler in the pasting paper may be greater than the concentration of powder or granular filler in the binder. The concentration of the powder or granular filler in the pasting paper depends on the amount of time that the binder/powder or granular filler is applied to the pasting paper with longer applications resulting in a greater concentration and shorter applications resulting in a lesser concentration. Regardless of the concentration of the powder or granular filler in the binder, the binder may be applied to the pasting paper to achieve a concentration of between 0.1% and 20% by weight of the powder or granular filler in the pasting paper as described herein.

In some embodiments, the powder or granular filler may be a silica material, such as synthetic precipitated silica, SiC, silicon carbide, and the like. An example of synthetic precipitated silica that may be used with the embodiments described herein is Hi-Sil™ 233-D, 233G-D, and/or WB-37 manufactured by PPG Industries, Inc. Other appropriate inorganic fillers can also be used and/or more than one filler may be used. Synthetic precipitated silica is an extremely hydrophilic material. As such, in addition to decreasing the pore size and air permeability of the pasting paper via filling of the holes in the pasting paper, the use of the synthetic precipitated silica greatly increases the wickability of the pasting paper. The use of the synthetic precipitated silica also enables a greater portion of coarse glass fibers to be used (e.g., having a fiber diameter greater than 6 µm and normally between 8 µm and 20 µm), thereby greatly increasing the strength of the pasting paper without significantly affecting and decreasing the wickability. Other materials, like wetting agents, can also be added to further improve the wicking property of the mat.

Figure 5:
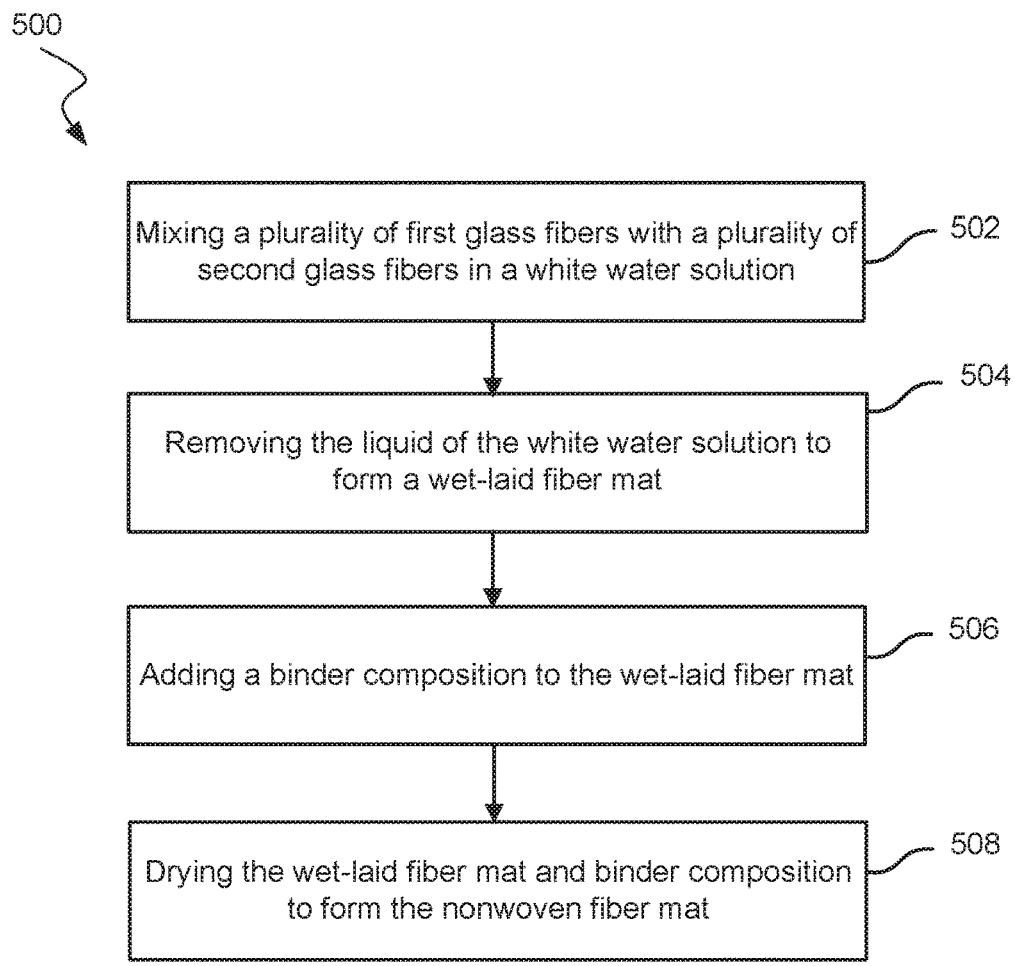
FIG. 5 illustrates a block diagram of a method of making a nonwoven fiber mat for reinforcing an electrode of a lead-acid battery or supporting a separator of a lead-acid battery.

Referring now to FIG. 5, illustrated is a method 500 of making a nonwoven fiber mat for use in reinforcing an electrode of a lead-acid battery, or supporting a separator of a lead-acid battery. At block 502, a plurality of first glass fibers is mixed with a plurality of second glass fibers in a white water solution. The plurality of first glass fibers have an average fiber diameter of less than 5 µm, and commonly less than 3 µm. In a specific embodiment, the first glass fibers have an average fiber diameter of about 0.7 µm. The plurality of second glass fibers have an average fiber diameter of greater than 6 µm, and more commonly have a fiber diameter between about 8 µm and 20 µm, and more commonly between about 10 µm and 15 µm. In a specific embodiment, the second glass fibers have an average fiber diameter of about 13 µm.

At block 504, a liquid of the white water solution is removed to form a wet laid mat that includes about 10% and about 50% by weight of the plurality of first glass fibers and between about 50% and 90% by weight of the plurality of second glass fibers. The liquid is typically removed by positioning the white water solution on an a porous or semi-porous conveyor and applying a vacuum to the white water solution. At block 506, a binder composition is added to the wet laid mat. At block 508, the wet laid mat and binder composition are dried to form the nonwoven fiber mat. The nonwoven fiber mat is formed to have an average pore size of between 1 µm and 100 µm and exhibit an air permeability of below 100 cubic feet per minute per square foot (cfm/ft$^2$) as measured by the Frazier test at 125 Pa according to ASTM Standard Method D737. As described herein, the nonwoven fiber mat may be formed to have an even smaller average pore size (e.g., between 1 µm and 10 µm) and/or exhibit an even lower air permeability (e.g., less than 10 cfm/ft$^2$ or less than 1 cfm/ft$^2$).

In some embodiments, between 0.1% and about 20% by weight of a powder or granular filler is added to the nonwoven fiber mat. The powder or granular filler is hydrophilic and acid resistant and has a surface area of greater than 10 m$^2$/g, and in many embodiments has a surface area of 150 m$^2$/g or greater. In such embodiments, the powder or granular filler may be applied to the binder that is applied to the wet-laid mat at block 506. In other embodiments, the powder or granular filler may be added to the white water solution with the first and second glass fibers. In still other embodiments, the powder or granular filler may be added to a secondary binder that is applied to the nonwoven fiber mat. In such embodiments, the powder or granular filler may comprises less than 20% by weight of the secondary binder composition, although in many embodiments, the powder or granular filler comprises between 1% and 4% by weight of the secondary binder composition. The secondary binder composition may be applied to the nonwoven fiber mat after drying of the wet laid mat and binder composition. In some embodiments, application of the powder or granular filler may be achieved via a combination of any of the above described application processes. The powder or granular filler may include a synthetic precipitated silica.

The above described nonwoven fiber mat having low air permeability and small pore sizes may be especially useful as a pasting paper that reinforces and structurally supports electrodes of lead-acid batteries. The small pore sizes of the nonwoven fiber mats creates a closed up and more impermeable mat that is well suited to reduce shedding of the electrode's active material. These mats may be less suited for use in structurally supporting polymeric film separators due to the small pore sizes and the negative effects that the more impermeable mats may have on the transport of ions and/or the electrolyte, although the negative effects of the mats may be reduced or countered due to the increase in wickability (e.g., resistance may be reduced as the mat is wetted by the electrolyte). For example, separator support mats are typically thin and open to minimize electrical resistance and maximize ion transport and the associated chemical reactions. For example, the pasting paper mats described here are normally between 5 and 50 mils thick.

Figure 6:
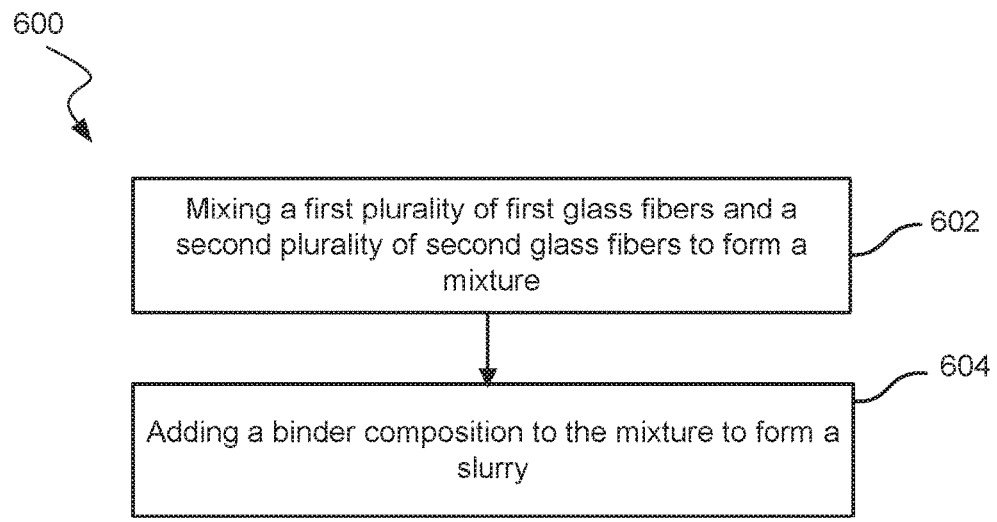
FIG. 6 shows a block diagram of a method of making a nonwoven fiber mat.

Referring now to FIG. 6, illustrated is a method 600 of making a non-woven fiber mat. Method 600 may include mixing a first plurality of first glass fibers and a second plurality of second glass fibers to form a mixture of glass fibers 602. The first plurality of first glass fibers may have diameters of less than 5 µm, between about 0.5 µm and about 1.0 µm, or about 0.7 µm, for example. The second plurality of second glass fibers may have diameters of greater than 6 µm. For example, the second glass fibers may have diameters of between about 8 µm and about 13 µm, between about 8 µm and about 10 µm, or between about 11 µm and 13 µm. The first plurality of first glass fibers may have a weight between about 10% and about 50%, between about 30% in about 40%, or between about 15% and 30% of the combined weight of the first plurality of first glass fibers and the second plurality of second glass fibers. While conventional nonwoven fiber mats for batteries may include more microfibers than coarse fiber, methods described herein with more coarse fiber than microfiber may produce a nonwoven fiber mat with increased mechanical strength. The mat's increased mechanical strength may result in a decreased, though still sufficient, wickability.

The first glass fibers may include a first glass composition, and the second glass fibers may include a second glass composition, where the first glass composition is different from the second glass composition. For example, different glass compositions include compositions with alumina (Al2O3), sodium oxide (Na2O), potassium oxide (K2O), boric oxide (B2O3), calcium oxide (CaO), magnesium oxide (MgO), or other compounds.

Method 600 may also include adding a binder composition to the mixture of glass fibers to form a slurry 604. The method may further include maintaining a pH of the slurry at about 7 or higher. The pH of the slurry may be non-acidic or from neutral to slightly basic. For example, the pH of the slurry may be maintained between about 7 and about 8.5. Without a high concentration of smaller diameter fibers, acid or acidic conditions may not be needed to increase the dispersion of these smaller diameter fibers. Reducing or eliminating the acid needed may hold processing advantages.

The method may include adding a powder or granular filler to the mixture of glass fibers. The powder or granular filler may increase wickability, possibly to counteract the decreased wickability with the decreased concentration of microfibers. The powder or granular filler may be hydrophilic and acid-resistant. For example, the powder or granular filler may be silica or synthetic precipitated silica. The powder or granular filler may between about 0.1% and about 10% by weight of the nonwoven fiber mat. The coarse fibers and the microfibers together may help hold the powder or granular filler in the mixture or slurry or finished nonwoven fiber mat.

The method may further include forming a mat, drying the mat, and curing the mat. Drying the mat may include blowing air through the mixture of glass fibers. A through-air dryer may dry the mixture of glass fibers and the cured binder composition. Method 600 may exclude drum dryers. Drum dryers may dry conventional nonwoven fiber mats by direct or substantially direct contact. In contrast, because of lower concentrations of microfibers in these and other methods, air may pass through the nonwoven fiber mat and dry the mat. Sufficient air to dry the mat may not be able to pass through a conventional nonwoven fiber mat.

The mixing, adding, drying operations in methods may be continuous processes. These operations may not be batch or semi-batch processes. In other words, these operations may be run continuously and without interruption. Continuous operation may allow for a faster throughput and more cost effective operation.

These or other examples of the present technology may include a lead-acid battery. The battery may include a positive electrode, a negative electrode, and a nonwoven fiber mat disposed adjacent positive electrode or the negative electrode. The nonwoven fiber mat include a first plurality of first glass fibers having diameters of less than 5 μm. The nonwoven fiber mat may further include a second plurality of second glass fibers having diameters greater than 6 μm. The first plurality of first glass fibers may make up between about 10% and about 50% by weight of the combined weight of the first plurality of first glass fibers and the second plurality of second glass fibers. The nonwoven fiber mat may also include a binder composition. The nonwoven fiber mat may have an average wick height of between about 1 cm and about 5 cm after exposure to sulfuric acid having 40 wt. % H2SO4 and/or a specific gravity of 1.28 for 10 minutes conducted according to method ISO8787 except that sulfuric acid having 40 wt. % H2SO4 and/or a specific gravity of 1.28 is used in place of water. The nonwoven fiber mat may also have a total tensile strength of greater than 4 lbf/in. The nonwoven fiber mat may be any nonwoven fiber mat described herein. The lead-acid battery may further include a filler. The filler may be synthetic precipitated silica or any filler described herein.

EXAMPLES

Example 1

Nonwoven glass mat samples were made with a pilot wet-laid machine. Process water with pH greater than 5 was used. The following Johns Manville glass fibers were used: K249T with a nominal fiber diameter of about 13 μm and a length of ¾ inch; 206-253 with a nominal fiber diameter of about 0.765 μm; 210X-253 with a nominal fiber diameter of about 3.0 μm; and 8 μm/8 mm C glass with a nominal fiber diameter of about 8 μm and a length of 8 mm. The compositions of the nonwoven fiber mats are shown in Table 1.

Air permeability was measured by the Frazier test, which is described by ASTM Standard Method D737. This test was usually carried out at a differential pressure of about 0.5 inches of water. Wicking strength per length or capillary rise was determined by ISO8787, with the wicking medium being 40 wt. % sulfuric acid. Thickness was measured with a gauge under pressure of 1.868 kPa or 10 kPa. Tensile strength of a 1 inch wide sample was measured using an ASTM method by an Instron machine. Tensile strength was measured in the machine direction (MD) and the cross-machine direction (CMD). The performance of the nonwoven fiber mats is shown in Table 2.

TABLE 1

Nonwoven fiber mat properties

| Sample ID | Mat Weight (lb/sq) | LOI | Micro-fiber % | Coarse Fiber | Micro-fiber |
|---|---|---|---|---|---|
| A | 0.7 | 10% | 50 | K249T | 206-253 |
| B | 0.7 | 20% | 50 | K249T | 206-253 |
| C | 0.7 | 5% | 40 | K249T | 206-253 |
| D | 0.7 | 10% | 40 | K249T | 206-253 |
| E | 0.7 | 20% | 40 | K249T | 206-253 |
| F | 0.7 | 10% | 30 | K249T | 206-253 |
| G | 0.7 | 20% | 30 | K249T | 206-253 |
| H | 0.5 | 5% | 40 | K249T | 206-253 |
| I | 0.5 | 10% | 40 | K249T | 206-253 |
| J | 0.5 | 20% | 40 | K249T | 206-253 |
| K | 0.5 | 10% | 30 | K249T | 206-253 |
| L | 0.5 | 20% | 30 | K249T | 206-253 |
| M | 0.7 | 10% | 50 | 8 um/8 mmC | 210X-253 |
| N | 0.7 | 10% | 80 | 8 um/8 mmC | 210X-253 |
| O | 0.7 | 10% | 50 | K249T | 210X-253 |
| P | 0.7 | 10% | 80 | K249T | 210X-253 |

TABLE 2

Nonwoven glass mat performance characteristics

| Sample ID | Ave. Air Perm (cfm/ft²) | Ave. Thickness under 1.686 kPa (mil) | Ave. Thickness under 10 kPa (mil) | Ave. Wicking Length at 10 min. (cm) | Ave. Wicking Length at 1 hr (cm) | Ave. MD Tensile (lbf/in) | Ave. CMD Tensile (lbf/in) | Total tensile strength normalized by weight [(lbf/in)/(lb/sq)] |
|---|---|---|---|---|---|---|---|---|
| A | 69.7 | 13.8 | 5.0 | 2.3 | 4.55 | 0.73 | 0.85 | 2.26 |
| B | 63.4 | 17.3 | 6.3 | 1.55 | 3.65 | 2.03 | 2.7 | 6.76 |
| C | 60.2 | 13.75 | 4.9 | 2.0 | 4.2 | 0.33 | 0.3 | 0.90 |
| D | 115 | 13.95 | 5.6 | 1.6 | 3.15 | 1.1 | 1.25 | 3.36 |

TABLE 2-continued

Nonwoven glass mat performance characteristics

| Sample ID | Ave. Air Perm (cfm/ft$^2$) | Ave. Thickness under 1.686 kPa (mil) | Ave. Thickness under 10 kPa (mil) | Ave. Wicking Length at 10 min. (cm) | Ave. Wicking Length at 1 hr (cm) | Ave. MD Tensile (lbf/in) | Ave. CMD Tensile (lbf/in) | Total tensile strength normalized by weight [(lbf/in)/(lb/sq)] |
|---|---|---|---|---|---|---|---|---|
| E | 116.7 | 14.85 | 6.1 | 0.8 | 1.95 | 2.53 | 2.82 | 7.64 |
| F | 144.1 | 13.7 | 6.1 | 1.2 | 2.65 | 1.86 | 2.36 | 6.03 |
| G | 208.5 | 13.5 | 7.0 | 0.3 | 0.8 | 5.2 | 5.18 | 14.8 |
| H | 131.8 | 11.2 | 4.0 | 0.9 | 2.9 | 0.19 | 0.22 | 0.82 |
| I | 171.5 | 11.75 | 4.2 | 0.45 | 1.25 | 1.0 | 1.33 | 4.66 |
| J | 304.3 | 11.05 | 4.0 | 0.3 | 1.5 | 2.2 | 3.8 | 12 |
| K | 325.7 | 10.35 | 4.1 | 0.2 | 0.45 | 1.31 | 1.85 | 6.32 |
| L | 435.6 | 9.55 | 4.5 | 0.5 | 1.0 | 2.73 | 4.27 | 14 |
| M | 398.5 | 10.1 | 3.9 | 0.3 | 0.7 | 0.57 | 0.48 | 1.50 |
| N | 350.0 | 12.15 | 4.5 | 0.35 | 0.55 | 0.58 | 0.55 | 1.61 |
| O | 567.8 | 12.9 | 5.2 | 0.3 | 0.55 | 1.27 | 2.33 | 5.14 |
| P | 382.3 | 14.15 | 5.0 | 0.4 | 0.55 | 0.62 | 0.98 | 2.29 |

When the percentage of microfiber increases from 30% to 50%, especially for microfiber 206-253, the processing difficulty increases. A nonwoven glass mat with 206-253 at 50% and LOI at 10% is challenging to process because of lower strength. As example 1 illustrates, when the percentage of microfibers is increased, the wickability of the mat is improved and the air permeability and strength are reduced. As shown in some of the later examples (e.g., Example 4), adding a powder filler to the mat (e.g., silica) improves the mat's wickability without compromising the mat's strength. Additional trials have shown that the addition of silica did not compromise the strength of the mat. It is believed that the main contribution for the mat's strength is from the binder and the percentage of coarse fibers.

Example 2

Nonwoven glass mat samples were made with a commercial wet-laid machine. Process water with pH greater than 5 was used. The following Johns Manville glass fibers were used: K249T with a nominal fiber diameter of about 13 μm and a length of ¾ inch; and 206-253 with a nominal fiber diameter of about 0.765 μm.

Air permeability was measured by the TEXTEST™ FX 3300 according to ASTM Standard Method D737. This test was usually carried out at a differential pressure of about 0.5 inches of water. Wicking strength per length or capillary rise was determined by ISO8787, with the wicking medium being 40 wt. % sulfuric acid. Thickness was measured with a gauge under pressure of 10 kPa. Tensile strength of a 3 inch wide sample was measured using an ASTM method by an Instron machine.

Table 3 shows the compositions of nonwoven fiber mats along with results. Total tensile strength is normalized by the weight of the mat. The non-dimensionalized tensile strength is significantly higher for samples in this example than in Example 1. Example 2 illustrates trends that are similar to those illustrated in Example 1. Specifically, that when the percentage of microfibers is increased, the wickability of the mat is improved and the air permeability and strength are reduced.

TABLE 3

Nonwoven fiber mat properties

| K249T/206-253 ratio | LOI (%) | Base wt. (lb/sq) | Air perm (cfm) | MD Tensile (lb/3") | CD Tensile (lb/3") | Wicking length @ 1 hr (cm) | Thickness (mil) @ 10 kPa | Total tensile strength normalized by weight [(lbf/in)/(lb/sq)] |
|---|---|---|---|---|---|---|---|---|
| 90/10 | 26.4 | 1.17 | 300 | 80 | 46 | 0.9 | 11 | 108 |
| 80/20 | 18.7 | 1.14 | 183 | 45.4 | 25.9 | 3.5 | 9.7 | 63 |
| 80/20 | 14.7 | 1.16 | 176 | 39.4 | 17.5 | 3.9 | 8.9 | 49 |
| 80/20 | 19.5 | 1.18 | 158 | 53.1 | 26.5 | 4.4 | 9.5 | 67 |
| 75/25 | 17.6 | 1.12 | 101 | 43.6 | 16 | 4.6 | 7.6 | 53 |
| 75/25 | 18.1 | 1.21 | 105 | 47 | 18.9 | 4.9 | 9.7 | 54 |
| 75/25 | 19.8 | 1.14 | 114 | 45.3 | 20.4 | 4.8 | 8.4 | 58 |

Example 3

Samples were measured for their Cobb$_{60}$ degree as an indication of their hydrophilic or wickability properties. The following Johns Manville glass fibers were used: K249T with a nominal fiber diameter of about 13 μm and a length of ¾ inch; and 206-253 with a nominal fiber diameter of about 0.765 μm. In these experiments, a 1.1 lb/sq mat with 75% K249T and 25% 206-253 with 20% LOI were used. Both sides of samples—the binder rich side and the wire side—were measured. The results are shown in Tables 4 and 5.

TABLE 4

Binder-rich side Cobb$_{60}$ degree

| Sample | Absorbed amount (g) | Absorbed amount (g/m$^2$) | Absorbed amount (g water/g mat) |
| --- | --- | --- | --- |
| 1 | 0.42 | 42 | 0.78 |
| 2 | 0.45 | 45 | 0.84 |
| 3 | 0.38 | 38 | 0.71 |
| 4 | 0.37 | 37 | 0.69 |
| 5 | 0.37 | 37 | 0.69 |
| 6 | 0.35 | 35 | 0.65 |
| 7 | 0.37 | 37 | 0.69 |
| Average | 0.39 | 38.71 | 0.72 |
| Std. Dev. | 0.03 | 3.50 | 0.07 |

TABLE 5

Wire side Cobb$_{60}$ degree

| Sample | Absorbed amount (g) | Absorbed amount (g/m$^2$) | Absorbed amount (g water/g mat) |
| --- | --- | --- | --- |
| 1 | 0.43 | 43 | 0.80 |
| 2 | 0.47 | 47 | 0.88 |
| 3 | 0.41 | 41 | 0.76 |
| 4 | 0.41 | 41 | 0.76 |
| 5 | 0.45 | 45 | 0.84 |
| 6 | 0.45 | 45 | 0.84 |
| 7 | 0.39 | 39 | 0.73 |
| Average | 0.43 | 43.00 | 0.80 |
| Std. Dev. | 0.03 | 2.83 | 0.05 |

As illustrated in Example 3, with all samples tested, the Cobb60 degree is less than 1. This means that the sample adsorbs a weight of water less than or equal to the weight of the mat. However, with the addition of silica, the Cobb60 value may be larger than 1.

Example 4

A series of nonwoven glass mat samples were made with a pilot wet-laid machine. A typical process water with pH>5 was used. The nonwoven glass mat samples included 13 μm and ¾" T glass fibers (K249) and 0.765 μm 206-253 microglass fibers that are both manufactured by Johns Manville. The glass fibers were blended at a ratio of 70/30 with 70% T glass fibers and 30% 206-253 microglass fibers. A silica filler (Hi-Sil™ 233) was added to the binder solution at ratios to the binder solids of 2% and 4% respectively. RHOPLEX™ HA-16 from Dow Chemical Company was used as the binder. A control sample mat was constructed having the same fiber configuration as the other mats, but without having silica added. As shown in Table 6 below, the addition of silica significantly closed up the mat and therefore reduced the air permeability values. Because the "holes" in the mat were filled by silica, the mat was more uniform and the wicking strength was dramatically improved.

TABLE 6 nonwoven fibers mats with added silica

| K249T/ 206-253 ratio | LOI (%) | Base wt. (lb/sq) | Wt. % of silica in the mat | Air perm (cfm) | Wicking length @10 mins (cm) |
| --- | --- | --- | --- | --- | --- |
| 70/30 | 20.3 | 1.11 | 0 | 77 | 1.1 |
| 70/30 | 23 | 1.45 | 12.7 | 11 | 4.4 |
| 70/30 | 25.9 | 1.16 | 15.3 | 3.2 | 4.3 |

The air permeability of the nonwoven mats was measured by the Frazier test described by ASTM Standard Method D737, with the results given in units of cubic feet per minute per square foot (cfm/ft$^2$). The test was carried out at a differential pressure of about 0.5 inches of water. The measured wicking strength/length, or capillary rise, is defined in ISO8787, however, the wicking medium was 40 wt. % sulfuric acid instead of water. As can be seen from Table 6, the addition of the silica increased the base weight of the mat. The binder content, as measured by Loss on Ignition, was relatively the same between the three mats. However, the air permeability significantly decreased while the wickability significantly increased for the samples with added silica. Accordingly, the addition of powder or granular silica significantly "closed up" the mat thereby enabling the mat to limit shedding of the active material as described herein while providing excellent wickability properties.

In the preceding description, for the purposes of explanation, numerous details have been set forth in order to provide an understanding of various examples of the present technology. It will be apparent to one skilled in the art, however, that certain examples may be practiced without some of these details, or with additional details.

Having described several examples, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific example may not always be present in variations of that example or may be added to other examples.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the glass fiber" includes reference to one or more glass fibers and equivalents thereof known to those skilled in the art, and so forth. The invention has now been described in detail for the purposes of clarity and understanding. However, it will be appreciated that certain changes and modifications may be practice within the scope of the appended claims.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of making a nonwoven fiber mat for use in reinforcing an electrode of a lead-acid battery, the method comprising:

mixing a plurality of first glass fibers with a plurality of second glass fibers in a white water solution, wherein:
the plurality of first glass fibers have an average fiber diameter of less than 5 µm; and
the plurality of second glass fibers have an average fiber diameter of greater than 6 µm removing a liquid of the white water solution to form a wet laid mat comprising about 10% and about 50% by weight of the plurality of first glass fibers and between about 50% and 90% by weight of the plurality of second glass fibers;

adding a binder composition to the wet laid mat; and drying the wet laid mat and binder composition to produce the nonwoven fiber mat such that the nonwoven fiber mat has an average pore size of between 1 µm and 100 µm and exhibits an air permeability of below 100 cubic feet per minute per square foot (cfm/ft$^2$) as measured by the Frazier test at 125 Pa according to ASTM Standard Method D737.

2. The method of claim 1, further comprising applying between 0.1% and about 20% by weight of a powder or granular filler to the nonwoven fiber mat, wherein the powder or granular filler is hydrophilic and acid resistant and has a surface area of greater than 10 m$^2$/g.

3. The method of claim 2, wherein the powder or granular filler is added to the white water solution or the binder composition.

4. The method of claim 2, wherein the powder or granular filler comprises synthetic precipitated silica.

5. The method of claim 2, wherein the nonwoven fiber mat exhibits an air permeability of below 10 cfm/ft$^2$ as measured by the Frazier test at 125 Pa according to ASTM Standard Method D737.

6. The method of claim 1, wherein the plurality of first glass fibers have an average fiber diameter of about 0.7 µm.

7. The method of claim 1, wherein nonwoven fiber mat exhibits:

an average wick height of between about 1 cm and about 5 cm after exposure to sulfuric acid having 40 wt. % H2SO4 or a specific gravity of 1.28 for 10 minutes conducted according to method ISO8787, and a total normalized tensile strength of greater than 4 lbf/in.

8. The method of claim 1, wherein the nonwoven fiber mat has an average pore size of between 1 and 10 µm.

9. The method of claim 1, wherein the nonwoven fiber mat exhibits an air permeability of below 10 cfm/ft$^2$ as measured by the Frazier test at 125 Pa according to ASTM Standard Method D737.

10. The method of claim 9, wherein the nonwoven fiber mat exhibits an air permeability of below 1 cfm/ft$^2$ as measured by the Frazier test at 125 Pa according to ASTM Standard Method D737.

11. A method of reinforcing an electrode of a lead-acid battery with a nonwoven fiber mat, the method comprising:

mixing a plurality of first glass fibers with a plurality of second glass fibers in a white water solution, wherein:
the plurality of first glass fibers have an average fiber diameter of less than 5 µm; and
the plurality of second glass fibers have an average fiber diameter of greater than 6 µm removing a liquid of the white water solution to form a wet laid mat comprising about 10% and about 50% by weight of the plurality of first glass fibers and between about 50% and 90% by weight of the plurality of second glass fibers;

adding a binder composition to the wet laid mat;

drying the wet laid mat and binder composition to produce the nonwoven fiber mat such that the nonwoven fiber mat has an average pore size of between 1 µm and 100 µm and exhibits an air permeability of below 100 cubic feet per minute per square foot (cfm/ft$^2$) as measured by the Frazier test at 125 Pa according to ASTM Standard Method D737; and positioning the nonwoven fiber mat adjacent the electrode to reinforce the electrode.

12. The method of claim 11, further comprising applying between 0.1% and about 20% by weight of a powder or granular filler to the nonwoven fiber mat, wherein the powder or granular filler is hydrophilic and acid resistant and has a surface area of greater than 10 m$^2$/g.

13. The method of claim 12, wherein the powder or granular filler is added to the white water solution or the binder composition.

14. The method of claim 12, wherein the powder or granular filler comprises synthetic precipitated silica.

15. The method of claim 11, wherein the nonwoven fiber mat has an average pore size of between 1 and 10 µm.

16. The method of claim 11, wherein the nonwoven fiber mat exhibits an air permeability of below 10 cfm/ft$^2$ as measured by the Frazier test at 125 Pa according to ASTM Standard Method D737.

17. The method of claim 11, wherein the nonwoven fiber mat exhibits an air permeability of below 1 cfm/ft$^2$ as measured by the Frazier test at 125 Pa according to ASTM Standard Method D737.

18. The method of claim 11, wherein nonwoven fiber mat exhibits:

an average wick height of between about 1 cm and about 5 cm after exposure to sulfuric acid having 40 wt. % H2SO4 or a specific gravity of 1.28 for 10 minutes conducted according to method ISO8787, and a tensile strength of greater than 4 lbf/in.

19. The method of claim 11, wherein the plurality of first glass fibers have an average fiber diameter of about 0.7 µm.

* * * * *